July 30, 1968 R. J. SWEET 3,395,254

PCM TIME DIVISION CUMMUNICATION SYSTEM
CONFERENCE CIRCUIT

Filed April 15, 1964 7 Sheets-Sheet 1

INVENTOR
R. J. SWEET
BY
R. C. Winter
ATTORNEY

July 30, 1968 R. J. SWEET 3,395,254

PCM TIME DIVISION CUMMUNICATION SYSTEM CONFERENCE CIRCUIT

Filed April 15, 1964 7 Sheets-Sheet 2

July 30, 1968 R. J. SWEET 3,395,254

PCM TIME DIVISION CUMMUNICATION SYSTEM
CONFERENCE CIRCUIT

Filed April 15, 1964 7 Sheets-Sheet 5

United States Patent Office 3,395,254
Patented July 30, 1968

3,395,254
PCM TIME DIVISION COMMUNICATION SYSTEM CONFERENCE CIRCUIT

Richard J. Sweet, Morristown, N.J., assignor to Western Electric Company, Incorporated, New York, N.Y., a corporation of New York Filed Apr. 15, 1964, Ser. No. 359,966
16 Claims. (Cl. 179—18)

ABSTRACT OF THE DISCLOSURE

A conference circuit in the central control unit of a communication system serving remote concentrators is disclosed in which a circulating delay line receives analog signals from one conference party following a digital to analog conversion. The analog signal then is sampled in distinct time intervals assigned to the other conference parties, reconverted to digital form and transmitted to the corresponding parties.

This invention relates to communication systems and more particularly to a conference circuit arrangement for use in electronic communication systems operated in time division multiplex.

In order to consolidate equipment and conserve communication paths in a telephone system, considerable effort is being directed to the development of systems utilizing time division rather than, or in conjunction with, space division, as heretofore exclusively employed. Essentially, in space division each connection between two telephones is established over a distinct transmission path, while in time division a single transmission path may be shared by a plurality of parties communicating in pairs. The latter operation is accomplished by sampling each conversation in turn at a high repetitive rate, the speech samples being filtered at the terminals to produce an accurate facsimile of the transmitted intelligence.

Further refinement is realized by the introduction of pulse code modulation of the sampled intelligence to ease transmission requirements of the system. Such a system, incorporating time division sampling techniques and pulse code modulation of the sampled intelligence for transmission, is disclosed in D. B. James-J. D. Johannesen-M. Karnaugh-W. A. Malthaner Patent 2,957,949, issued Oct. 25, 1960.

The system disclosed in the James et al. patent also incorporates a common control type of operation in which a single unit controls the operations of the entire system, including a plurality of remote concentrator units. Advantageously, conference circuitry may be located in the control center for servicing the entire system. This expedient obviates the duplication of conference circuitry at each of the remote concentrator units and also permits the establishment of conference connections among stations terminating on a number of different remote concentrator units.

It is an object of this invention to provide conference service in a PCM time division multiplex communication system.

It is another object of this invention to provide an economical conference circuit in a common control unit capable of serving stations terminating on a plurality of remote concentrator units.

It is still another object of this invention to provide a flexible conference arrangement which permits any station in the system to establish a conference connection among a plurality of stations and to add parties to the conference at any time.

These and other objects of the invention are attained in accordance with one specific illustrative embodiment wherein a conference circuit comprises an analog bridge which receives signals in sequence from each of the parties to the conference during a discrete time interval assigned to each conferee, circulates the signals, and permits their sampling by each of the other conferees in the corresponding assigned time interval.

Such a conference circuit has utility in a telephone system of the type disclosed in the aforementioned James et al. patent, in which a transmission link is shared among a number of simultaneous conversations by dividing a prescribed time interval, known as a frame, into a plurality of sampling intervals referred to as time slots. Each active line is assigned a time slot and is sampled in that time slot during successive frames. Sampling at a sufficiently high rate permits accurate reproduction of the original speech at the receiving terminal. An acceptable frame rate is 8 kilocycles, or twice the highest speech frequency to be transmitted. With this frame rate, each conversation is sampled once every $\frac{1}{8000}$ of a second or 125 microseconds. Assuming twenty-five time slots available in the frame, the interval of each time slot is $\frac{1}{25}\times\frac{1}{8000}$ or five microseconds. Each conversation then is sampled repetitively during a distinct five microsecond time slot in every 125 microsecond frame.

The incorporation of PCM transmission in such a system determines that the voice samples are available in the common control unit in pulse coded form. Thus, in order to accommodate a conference circuit which operates upon speech samples, a conversion to voice must be performed in the common control unit prior to employment of the analog bridge. A single analog bridge is provided for each conference and will accommodate speech samples from a plurality of stations located in different remote areas and terminated on distinct remote line concentrator units. It is also possible to employ several available bridges in tandem for conferences involving more parties than could be accommodated by a single bridge.

A conference connection may be originated by a party actuating the equipment at his station in a particular manner, e.g., depressing a button on the handset to indicate a request for conference service and thereafter transmitting the designations of each of the desired conferees to the common control unit. Similarly, parties active on a normal call connection may add parties to their conversation by having one of the original parties actuate the conference mechanism at his station.

If space on a conference bridge in the common control unit is not available, the requesting party is provided with a busy tone and may reinitiate the request by depressing the switchhook momentarily. Also, if the request is placed by a party already active on a call connection, the busy tone is time limited, and the request to add a party may be reinitiated upon termination of the busy tone.

Such a conference arrangement requires that each conferee be assigned a distinct time slot. Thus a limitation on the maximum number of conferees is the number of time slots available in a frame interval, viz., twenty-five in this example. However, it is quite apparent that traffic requirements of a telephone system would dictate a lesser number of possible conferees, this number determining the size of the analog bridge required.

It is a feature of this invention that a group of lines active on a conference connection in a time division switching system each be assigned a different time slot during which information from the line is stored in a conference circuit and information pertaining to other lines is abstracted therefrom.

It is another feature of this invention that a conference circuit comprise an analog bridge, gating means for connecting the bridge to individual conferees in predetermined distinct time slots, and coding and decoding apparatus for converting between the speech samples stored in the analog bridge and the PCM signals transmitted between the bridge and the conferring stations.

It is still another feature of this invention that each station be provided with facilities for automatically establishing a conference connection to the desired number of parties.

It is a further feature of this invention that the conference establishing apparatus comprise means for permitting a party active in a conversation to add additional parties while maintaining the original connection.

A complete understanding of these and other features of this invention may be gained from consideration of the following detailed description, together with the accompanying drawing, in which.

Figure 1:
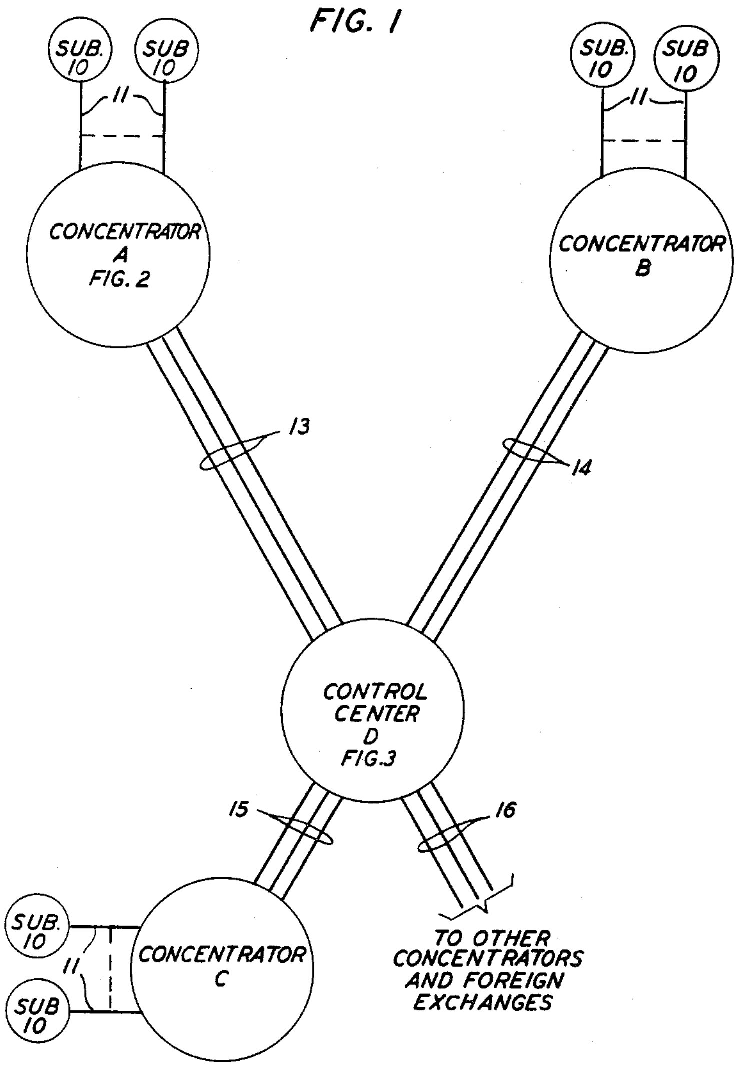
FIG. 1 is a schematic representation in block diagram form of a telephone system in which a conference circuit in accordance with this invention may be employed.
Figure 8:
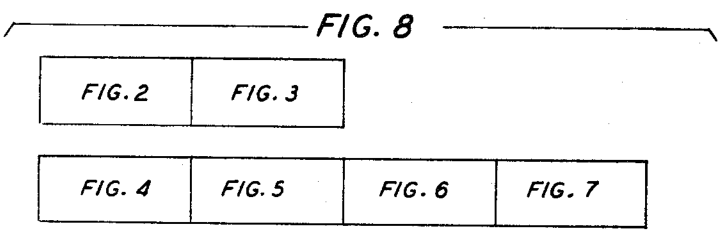

FIGS. 4 through 7 illustrate a schematic representation of one illustrative embodiment of a conference circuit in accordance with this invention that may be employed in the telephone system of FIG. 1; and FIG. 8 is a key chart indicating the manner in which FIGS. 2 and 3 and 4 through 7 may be joined in to provide complete and understandable circuits.

Turning now to the drawing, there is depicted in FIG. 1 a telephone system of the type disclosed in the aforementioned D. B. James et al. patent wherein the conference circuit in accordance with my invention may advantageously be employed. In this system a plurality of stations 10 are individually connected to telephone lines 11 and may be selectively connected via a switching network in remote concentrator units such as A, B and C to a common control center D over common transmission links 13, 14 and 15, respectively. Control equipment in the center D then is operated, for example, in accordance with signals from a station 10 at remote concentrator A to complete a connection through the control center D to a station in the same concentrator A, in remote concentrators B or C, or to stations in other remote concentrators and foreign telephone systems (not shown) via common transmission link 16.

Figure 2:
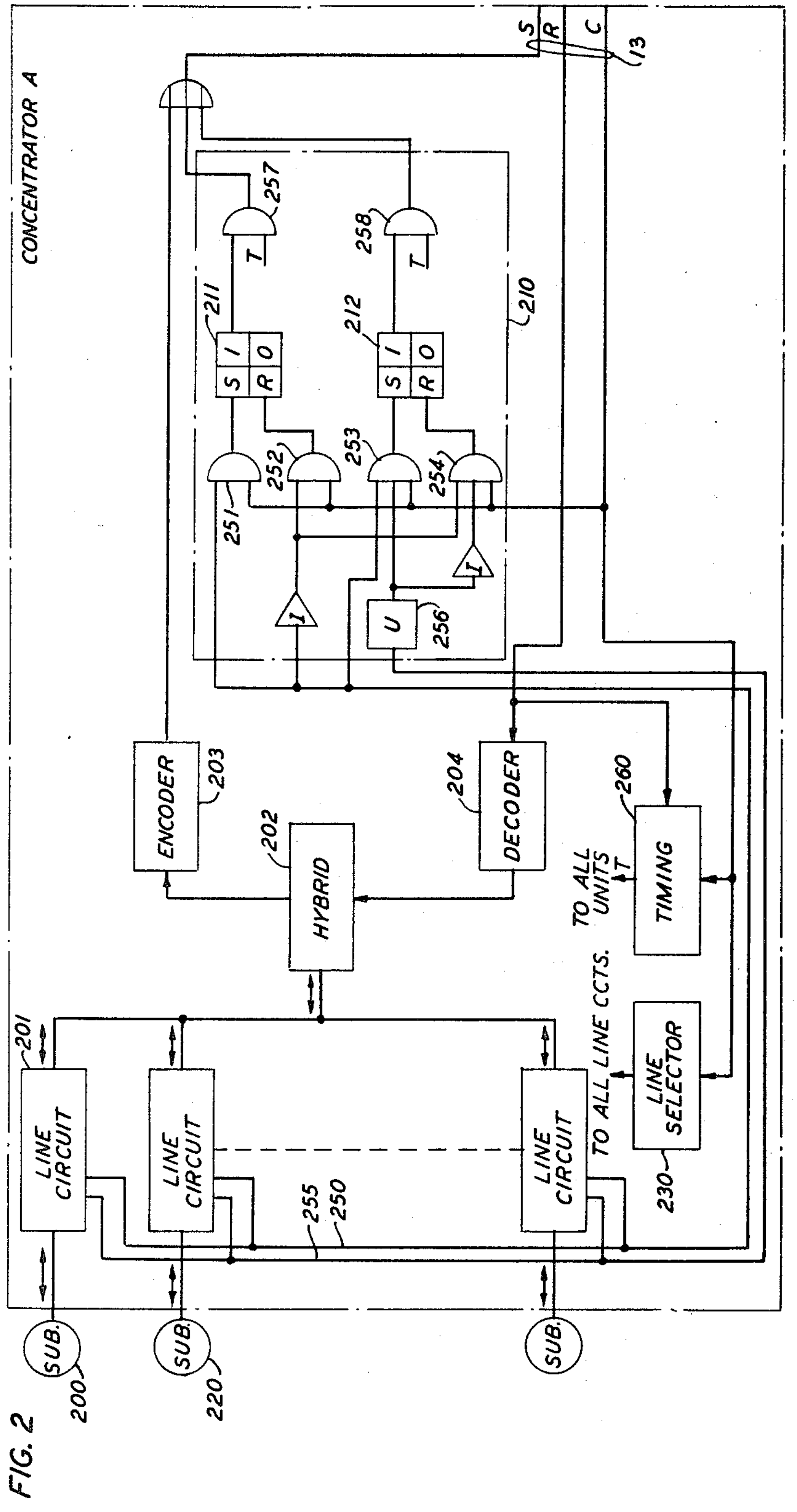
FIGS. 2 and 3 depict the control center and one remote concentrator unit of such a system in block form.
Figure 3:
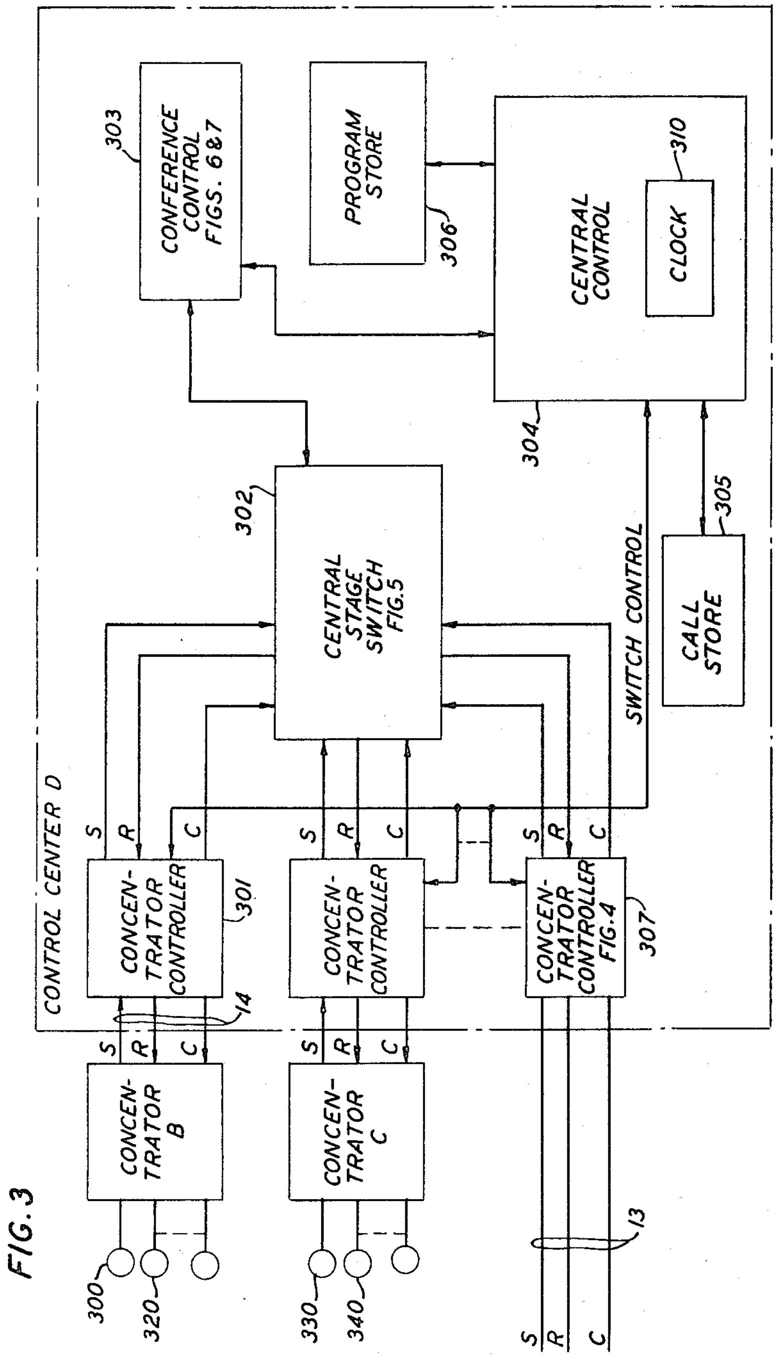
Figure 4:
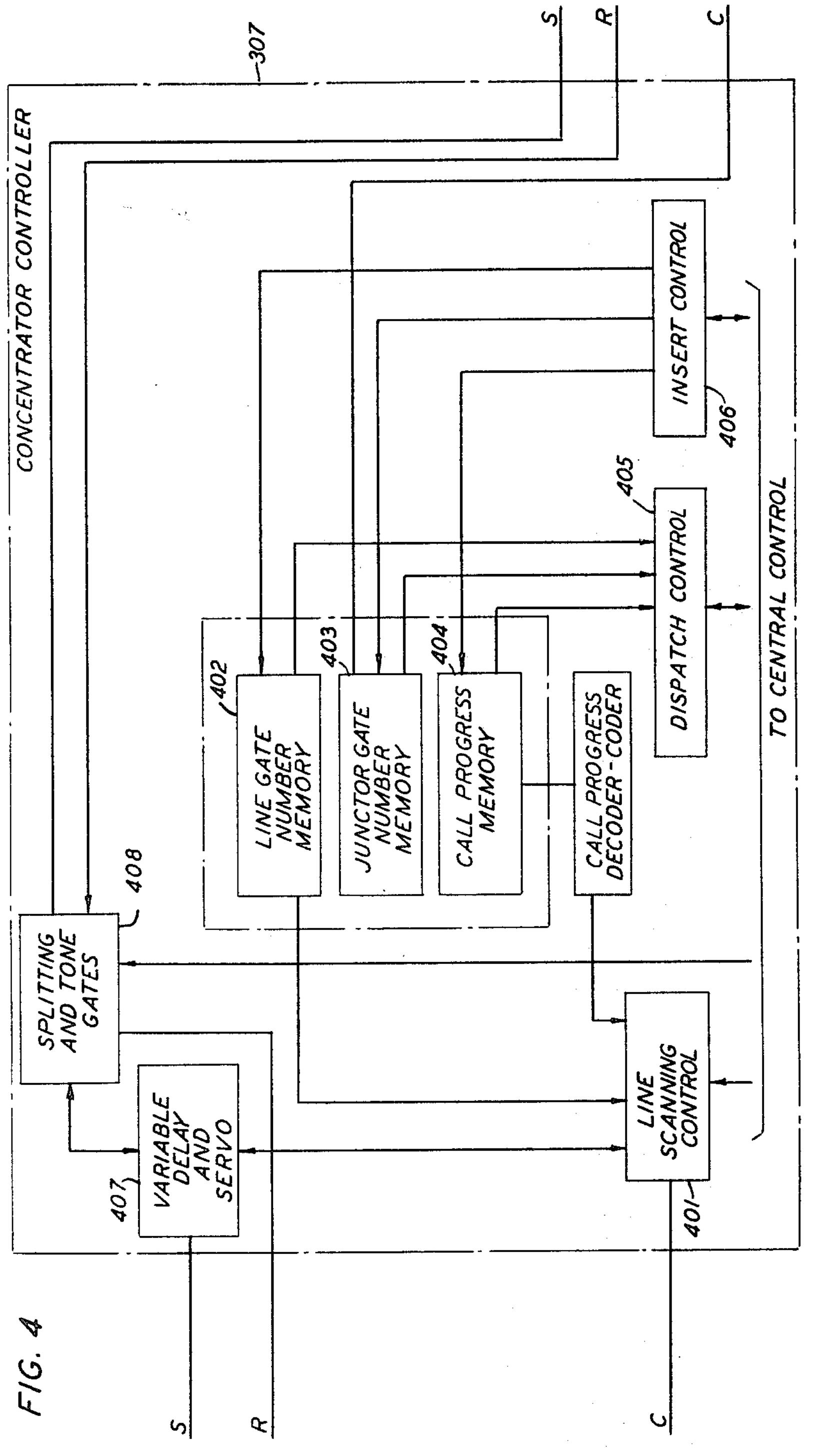

The system is operated on a time division multiplex basis in which each active station is assigned a particular sampling period or time slot in a recurring group of time slots. Referring now to FIGS. 2 and 3, upon each occurrence of a time slot assigned to a particular calling station, for example, station 200 connected to concentrator A, a sample of information is transmitted from station 200 through the corresponding line circuit 201 and time-shared switch 202 to encoder 203 in the associated remote concentrator A. The sample is transformed into a series of digital impulses and transmitted over the S lead of transmission link 13 to the control center D. From the control center D the signal sample, still in digital form, is transmitted to the receiving station.

Consider, for example, that the receiving station is station 300, terminated on remote concentrator B. The digital signal is transmitted over the R lead of transmission link 14 to the decoder at the remote concentrator B where it is restored to a voice frequency signal and received at station 300 in the same time slot of a succeeding frame.

It may be noted in this brief outline of the system operation that all transmission between the remote concentrator units and through the control center is accomplished in digital form and that the equipment for translation between voice frequency and digital signals is contained in the remote concentrator units. In order to perform a multiple addressing operation essential to establishment of a conference connection in accordance with my invention, such information in digital form must be reconverted to voice frequency signals at the control center D and placed on an analog bridge which is sampled during the distinct time slot assigned to each of the conferees.

Before proceeding with a detailed description of the circuitry, it may be of assistance to the reader to follow a request by station 200 for a conference connection through the network.

A request for a conference connection may be initiated at any time after a party has activated his station by going "off-hook." Thus when station 200 is taken off-hook, a request for service is detected by monitor circuit 210. Subsequently, this information is transmitted to the control center D along the S lead of common link 13. The party at station 200 now initiates the conference connection by depressing a button on the handset which causes another signal to be transmitted to monitor circuit 210 and subsequently via the S lead to the control center D, signifying that a conference connection is desired.

A record is maintained at the control center of all active time slots and conference bridges. If a time slot is available, it is reserved for the new service request from station 200, as indicated by the first transmitted signal. Thereafter, the availability of a conference bridge is determined at the control center in response to receipt of the second transmitted signal. Lacking an available time slot and/or an available conference bridge, a busy tone is transmitted to station 200, which may reinitiate the call by going on-hook and subsequently off-hook again.

If a conference bridge is available, it is reserved for this call, and the bridge gate number associated with one of the legs of the bridge is stored in the conference control 303 during the same time slot that was assigned to station 200. A dial tone is thereupon transmitted to station 200. The party at station 200 then transmits the designations of each of the desired conferees in turn. As each conferee is added to the connection, the conference button at station 200 is depressed and a dial tone is again applied to station 200.

Each party added to the conference is assigned a distinct time slot. If a particular called party's line is busy or if there is no available time slot in which to establish the connection, the calling party at station 200 will receive a timed busy tone. The request may be reinitiated at any time after the busy tone time-out. In the event that the conference bridge is filled to capacity when a request to add an additional party is received, a busy tone is again transmitted to the calling party.

The control center D has the capability of adding additional parties to the proper conference bridge. For this purpose, each bridge gate is associated with a distinct bridge leg of a single conference bridge. The identification of station 200 requesting conference service is found in the central control 304 during the normal line scanning sequence, and the conference bridge assigned for that purpose is determined by interrogating the bridge gate memory during the time slot assigned to station 200.

The situation is slightly different in the case of an active connection between two parties, e.g., stations 200 and 220, FIG. 2, who subsequently desire to add additional parties. In this instance the parties at stations 200 and 220 are connected in the same time slot, while the conference connection requires that each conferee be assigned a distinct time slot.

Consider now that during normal scanning, the control center D finds that the party at station 200 is requesting conference service by noting the conference signal transmitted through the corresponding line circuit. If no conference bridge is available at this time, station 200 receives a timed busy tone and the parties at stations 200 and 220 may continue their call until they desire to go on-hook or reinitiate the request for the conference connection.

If a conference bridge is available, it is reserved, and a bridge gate number associated with a particular leg of the assigned conference bridge is stored in the bridge gate memory during the time slot assigned station 200. Concurrently, a new time slot is selected for station 220 and a second bridge gate number corresponding to another leg of the same conference bridge is stored in the bridge gate memory during the time slot selected for station 220. Requests for adding additional parties to the conference are then handled in the same fashion as previously described for a request for a conference connection from station 200 concurrent with the initial request for service.

Thus it is seen that apart from the more general system requirements, establishment of a conference connection requires the determination of (1) the availability of a conference bridge; (2) whether the party requesting conference service is already connected to a bridge; (3) if an active bridge can accommodate additional parties; and (4) the designation of the available bridge locations. Furthermore, the conference circuitry must be arranged so as to allow any of the parties associated with the conference call to add a new party and permit any of the conference parties to disconnect at any time without interfering with the remaining parties to the conference or inhibiting the subsequent complete utilization of the bridge due to the remaining parties not being connected to the bridge in sequence.

SYSTEM COMPONENTS

Before proceeding with a detailed description of the conference connection, the various system units involved in the establishment of the conference connection will be described, with emphasis on the specific components pertaining to the conference control itself. All of the units required for the general system operation, as described hereinafter, are disclosed in detail in the aforementioned James et al. patent.

As illustrated in FIG. 1, the complete telephone system comprises a control center D serving a plurality of remote concentrator units such as A, B and C, each of which terminates a plurality of telephone lines 11. The control center D comprises a central control 304, FIG. 3, which provides the requisite control for establishing, monitoring and terminating all system calls. It is capable of interpreting and executing in sequence all of the orders contained in the program store 306. This is a semipermanent record which is changed manually as required. Included in the central control 304 is a clock 310 which not only controls the progress of the control operation in accordance with the stored program, but also keeps the entire system in synchronism, the latter being an essential requirement of a time division switching system operation, as described more fully hereinafter.

The call store 305 is a temporary memory which records information that is continually changing, i.e., a record of the progress of a call through the system. The line scanning control 401 contained in the concentrator control 307, as its name implies, serves to observe each system line in a regular sequence to obtain supervisory information as to the status of that line, i.e., whether off-hook or on-hook, and to provide this information to the central control 304. The various memories; viz., the line gate number memory 402, the junctor gate number memory 403, and the call progress memory 404 contained in the concentrator control 307 serve to recall for the benefit of various system components the active lines, the gates assigned and the particular state of call activity. Each active line is sampled in a discrete assigned time slot recurring in successive frame intervals, a frame comprising the number of time slots available to the sysem. The memories 402–404 cooperate with the central control 304 via the dispatch control 405 and the insert control 406 in maintaining the record and performing the requisite control operations pertaining to a particular line assigned to a discrete time slot.

As the information sampled in a particular time slot may travel a considerable distance between the remote concentrator terminating the line and the control center, the information is delayed so as to be acted upon in the control center in the same time slot one frame interval later than the time slot in which it was originally sampled. This delay operation is performed by the variable delay and servo 407. The splitting and tone gates 408 serve to control the transmission of speech and supervisory signals over the common communication links between the control center D and the various remote concentrators.

Figure 5:
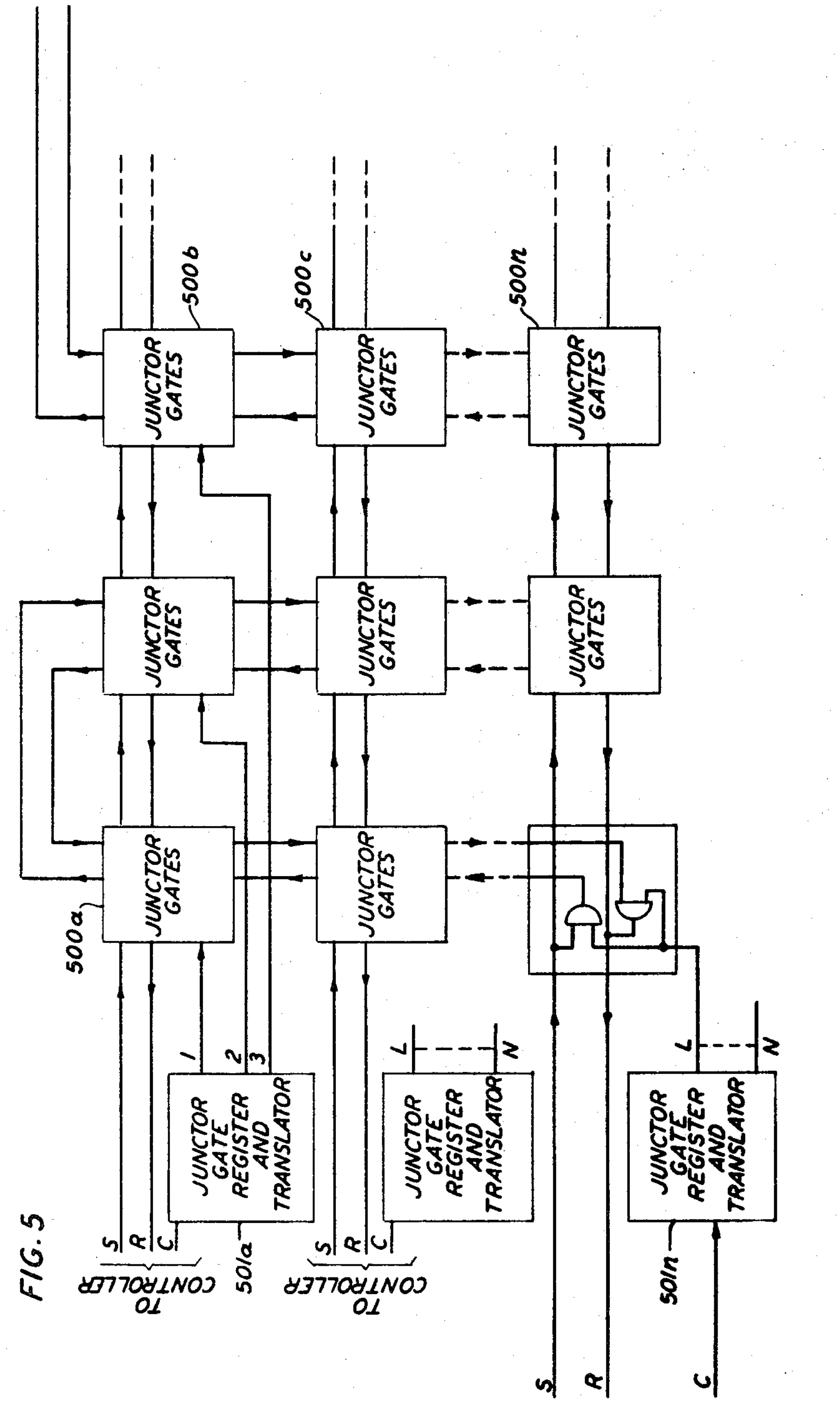

Finally, the control center D comprises a central stage switch 302. This unit, as illustrated in FIG. 5, comprises junctor gates 500a–500n which permit each remote concentrator to have access to any other remote concentrator or foreign exchanges or special circuitry such as the conference control circuitry via junctor pairs. The junctor gates are controlled via the junctor gate register and translator units 501a–501n which, in turn, each receive instructions from a corresponding concentrator controller such as 307. The junctor gates 500a–500n are simple diode-transistor AND gates well known in the art.

Upon assignment by central control 304 of an available junctor pair and time slot to be used by the parties to a call, this information is transmitted to the proper concentrator controller such as 307 where it is stored. At the appropriate times thereafter, the controller 307 sends the information to the proper junctor gate register and translator unit, in this instance unit 501n, so that the assigned junctor pair can be selected and the calling and called parties' lines interconnected. The junctor gates remain closed for a complete time slot, so that the speech sample provided in this instant of time by each of the parties can be interchanged. Thus the calling party's speech sample is transmitted via the S lead of the corresponding common transmission link, such as 13 to the control center D and through the appropriate junctor gates to the R lead of the common transmission bus corresponding to the remote concentrator terminating the called party's line. The same operation simultaneously occurs with respect to the called party's speech sample.

Each line concentrator is, or at least may be, remotely located with respect to the control center D. A determination is made as to how many lines may be terminated on each concentrator, based primarily on traffic requirements, coupled with the number of time slots available between the particular line concentrator and the control center. Each line concentrator such as concentrator A, FIG. 2, comprises five basic components which are disclosed in detail in the aforementioned James et al. patent. The line circuit, such as 201, connects a corresponding station 200 to the concentrator. It accepts information such as speech from the station and stores it in a grounded capacitance terminating a low pass filter. A time division gate is enabled at the beginning of the time slot assigned to station 200, serving to transfer the stored information from the line circuit to the common communication link 13. The low pass filter serves to isolate the station 200 from the noise generated by the line gate sampling frequency. Also included in the line circuit 201 is a scan gate which cooperates with the line scanning control 401 in the control center D to provide notice of changes in the state of the corresponding station 200. If the station was on-hook when previously scanned, a pulse would be transmitted to the control center D via the S lead of common link 13 during the first scan after the station goes off-hook. A similar situation occurs when the station goes on-hook after a period of being off-hook.

The line selector 230 maintains a record of all active call connections in a number of shift registers. This information is subsequently utilized during the time slot assigned to a particular call to activate the line gates corresponding to the calling and called stations. A binary to one-out-of-*n* translator is utilized in the line selector 230 to effect this line gate selection from the stored line designations. The hybrid circuit 202 provides the conversions from the two-wire line to the four-wire common transmission link 13. Such a conversion in a time division network is illustrated in James et al. Patent 2,936,338, issued May 10, 1960.

The encoder 203 and the decoder 204 permit the conversion between speech samples in pulse amplitude modulated form and the pulse code modulated form utilized in the control center D. The timing circuit 260 or local clock provides synchronization of the time intervals at the remote concentrator with those employed at the control center D, such that information transmitted to the control center via the S lead in link 13 will match the time interval in which information respecting the same call is received from control center D via the R lead of link 13. However, all timing signals distributed throughout the line concentrator are counted down and combined in the line concentrator itself including those signals defining the time slots and the line scanning signals.

CONFERENCE CIRCUIT COMPONENTS

The following circuit units are added to the basic system framework described hereinbefore to permit the conference operation in accordance with this invention. The only addition required in each remote concentrator is the monitor circuit 210 comprising two flip-flop registers 211 and 212 and associated logic gates. Since the C lead of link 13 is unidirectional, the S lead must be utilized to transmit information pertaining to the line condition from the remote concentrator to the control center. Thus, under normal conditions, when the station goes off-hook, the scan pulse from timing circuit 260 is delivered through the corresponding line circuit such as 201 and via lead 250 to the monitor circuit 210 which stores the signal in flip-flop 211 until the appropriate time for transmission to the control center. If the party at the calling station desires to place a conference call, he activates the station to generate another signal which is transmitted through the corresponding line circuit 201 and over lead 255 to monitor circuit 210, which thereupon stores this signal in flip-flop register 212 and again in appropriate timing, delivers this signal to the control center via the S lead of link 13. This operation will be discussed in detail hereinafter in connection with the progress of a conference call through the system.

Figure 6:
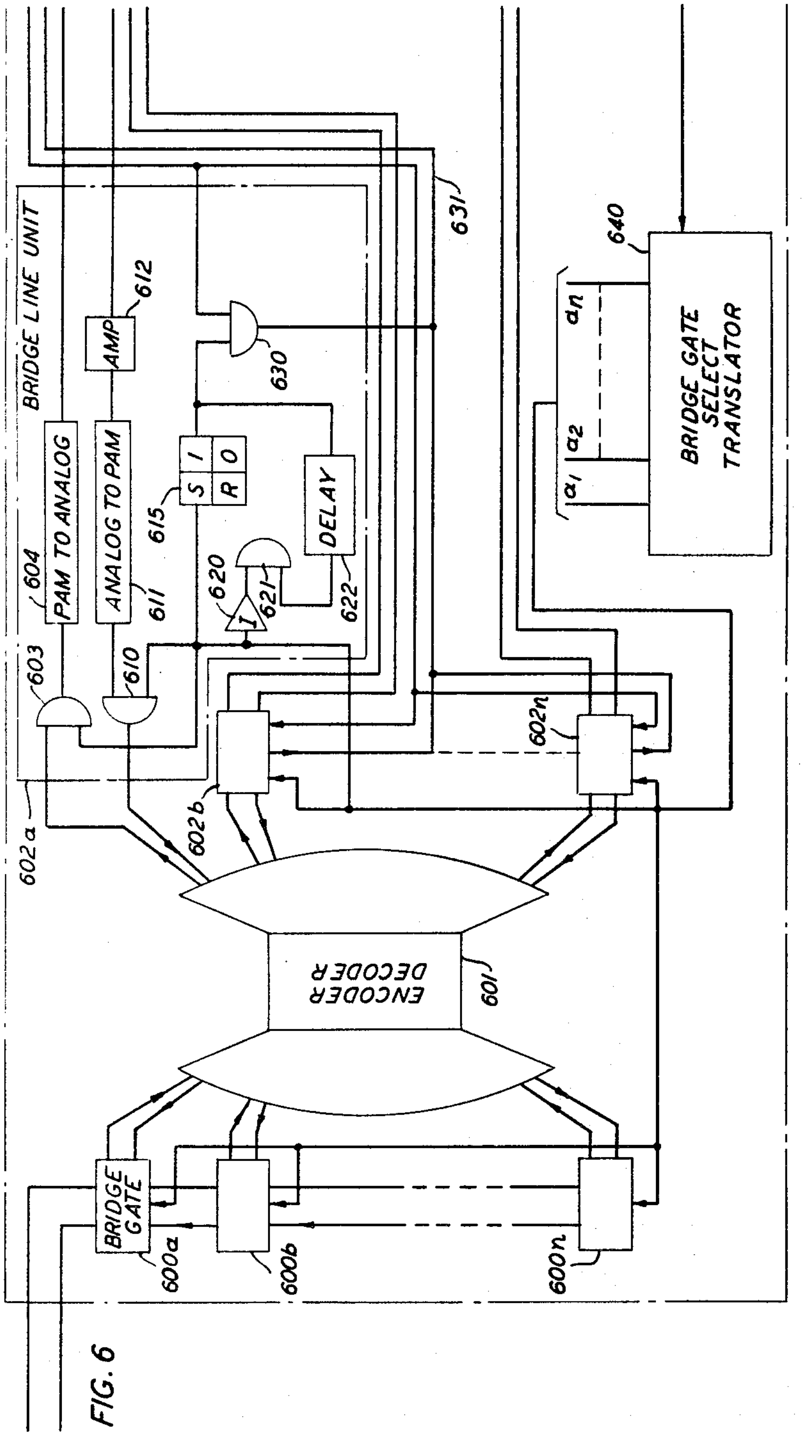
Figure 7:
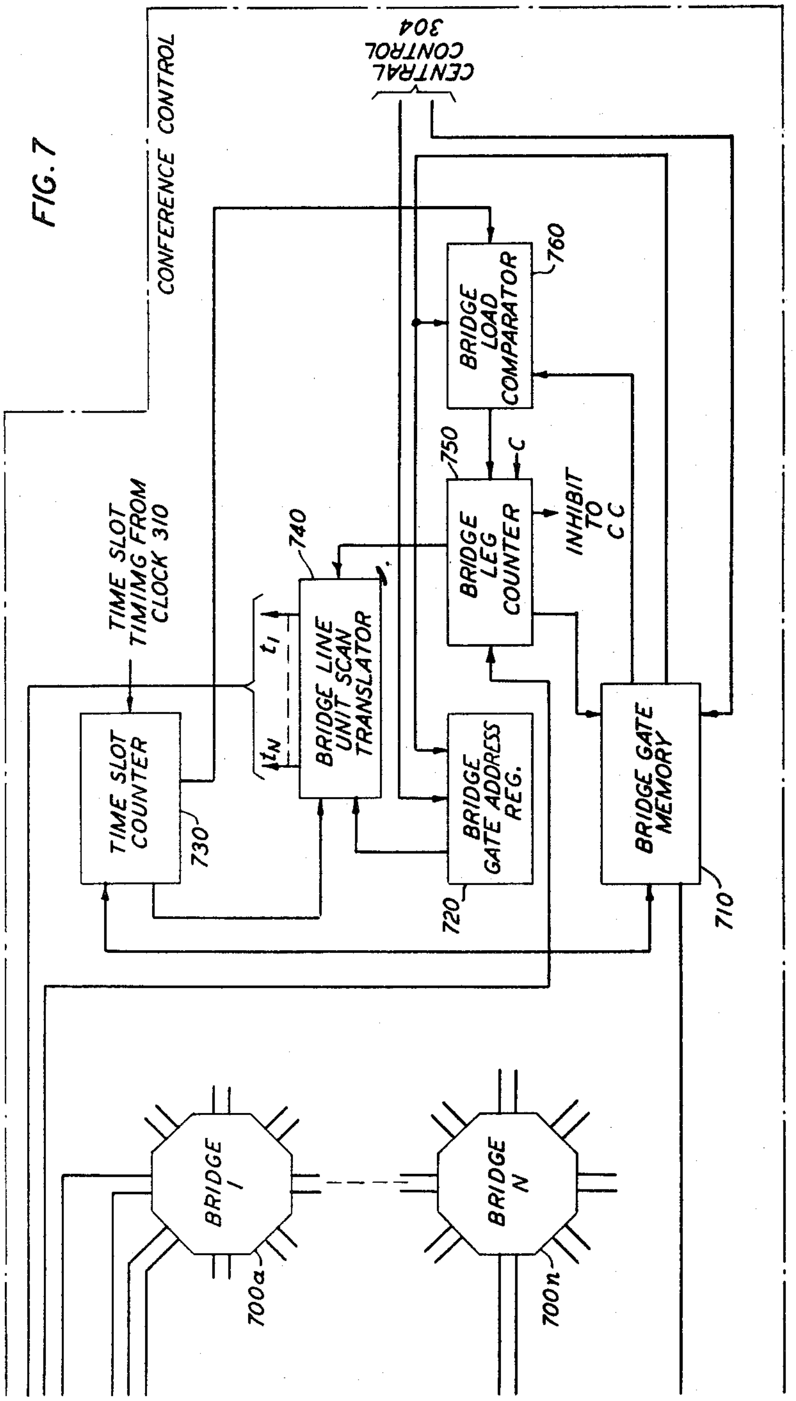

The components of interest to the conference operation at the control center D are illustrated in FIGS. 6 and 7. Bridge gates 600*a*–600*n* are identical in form to the line gates in each remote concentrator. The encoder-decoder 601 corresponds to the encoder and decoder at each remote concentrator serving to convert the PCM signals available in the control center D to PAM signals for use in the conference bridge. The bridge line units 602*a*–602*n* each comprise a register flip-flop 615, a delay line 622, an amplifier 612, and units 604 and 611 for conversion between PAM signals and analog signals, as well as various logic gates as known in the art.

The analog bridges 700*a*–700*n* each accommodate a distinct conference and comprise a circulating tapped delay line designed such that there is an equal amount of attenuation through the bridge for each tap or potential conferee on it. It is for this reason that the signal from the bridge to the encoder-decoder 601 must first be amplified in amplifier 612 of the bridge line unit 602*a* by an amount equal to the attenuation. The reason for utilizing an analog bridge rather than a digital arrangement is that the analog bridge avoids the problems of attempting to add the digital information provided by a plurality of conferees talking simultaneously. The analog bridge simply adds the several analog signals and encodes the resulting signal in PCM for transmission to the conferees. The analog bridge may take any of the forms well known in the art.

Bridge gate select translator 640 is a conventional translator which serves to select the bridge gate and the associated line unit addressed by the bridge gate number memory 710. At a definite clock time which occurs during each time slot, the address which is registered in the bridge gate memory 710 is gated to the bridge gate select translator 640 which thereupon converts the address from the binary designation to the one-out-of-*n* signal necessary to select the addressed bridge gate 600*a*–600*n* and bridge line unit 602*a*–602*n*.

The bridge gate memory 710 comprises a shift register serving to recirculate information serially through a delay line and having a driver on one end to insert bits into the delay line and an amplifier and pulse shaper for feeding the pulses back to the shift register to complete the loop.

The bridge gate address register 720 is a double rail register having address bits and an "insert index bit" which is used for counting and gating purposes. The index bit is stored with each address. Addresses may be written into register 720 from either central control 304 or from bridge gate memory 710. The address stored in register 720 may be gated to bridge gate memory 710 or to line unit scan translator 740.

The translator portion of bridge line unit scan translator 740 is the same as that used for bridge gate selection. The scan is initiated with the end-of-count pulse from time slot counter 730. This pulse gates the addresses which exist in bridge gate address register 720 and in bridge leg counter 750 into translator 740 and the output pulse scans the addressed line unit 602*a*–602*n*. If the result of the scan is a "1," bridge leg counter 750 is advanced and a pulse is returned to translator 740 to gate in the new address for the next scan. If the result is "0" there are no further scans of the line units. Again a conventional binary to one-out-of-*n* translator and associated logic circuitry are involved in this unit.

Bridge leg counter 750 is a conventional counter capable of counting from the reset condition to 7. Upon the eighth count a register at the end of the counter is set. If counter 750 has made eight counts when an end-of-count pulse is received from time slot counter 730, an inhibit signal is sent to central control 304. The counter is reset by a pulse from bridge gate memory 710. It is advanced by each input from bridge load comparator 760. The address which is in counter 750 at the end of the count of time slot counter 730 is gated to bridge line unit scan translator 740. If that particular address is in use, a pulse is returned from scan translator 740 which advances bridge leg counter 750. The latter counter in turn sends a pulse to scan translator 740 to gate in the advanced address in the counter 750 for the next scan. The address in counter 750 is ultimately gated into bridge gate memory 710 for called parties.

Bridge load comparator 760 contains a register which stores the address to be compared. During each time slot for one complete frame the addresses appearing in bridge gate memory 710 are gated to comparator 760. Each time a "compare" occurs, a "1" is sent to bridge leg counter 750 to advance it.

A CONFERENCE CALL

Considering now the operations involved in establishing a conference connection, it will be assumed that station 200 desires to establish a conference connection including stations 220, 320 and 330. It is further assumed that bridge 700*a* is available for this conference, that bridge gate 600*a* and bridge line unit 602*a* are assigned to the calling station 200, and that others of the bridge gates and line units are assigned to the conferees as they are added to the connection. In this description, of course, the operation of the conference circuitry will be emphasized with only sufficient description of the operations involved in the establishment of a normal connection to provide continuity, the detail of such operations being fully disclosed in the aforementioned James et al. Patent 2,957,-949.

One term of reference utilized in the following description is the frame interval and, in order to understand its import, a brief description of the time-sharing operation would be in order. Rather than supply individual connections between each station and the control center, a group of stations time-share a common line from the remote concentrator to the control center. This is possible in that speech may be transmitted as distinct samples at a uniform rate without destroying the essential speech characteristics. The sampling rate must be twice the frequency of the highest expected frequency signal. Thus for a speech band of approximately 4,000 cycles per second, a sampling rate of 8,000 samples per second would be required. The practical limitation on the sampling rate is, of course, the components utilized in the switching operations. Let us assume that a sampling frequency $f_s$ is utilized. Thus if an active station is sampled once during the period $T_s=1/f_s$ no information will be lost. The period $T_s$ is the time between two successive samplings of information from an active station and is called a "frame." A frame is divided into a number of equal sampling periods called "time slots." During each time slot the information from a different active station may be sampled and subsequently transmitted over the common bus to the control center. In this fashion a group of stations time-share the equipment.

When station 200, FIG. 2, goes off-hook, a request for service is generated in the following manner: A pulse from timing circuit 260 is passed through the calling line circuit 201 and over lead 250 to monitor circuit 210. A number of frames are required for line scanning. For the purposes of this description, it will be assumed that five frames are required in this system and that at least three scan sequences of five frames each will be required to establish the conference connection. As a practical matter, since line scanning is accomplished rapidly, viz., in the range of once each 125 milliseconds, many more than three scan sequences will occur before the connection is established.

The first of the three sequences is carried out independently in each concentrator controller and is for the purpose of determining if there is any change in the condition of each line terminating on the corresponding remote concentrator. The second sequence determines the condition of the called party's line after the called party's number has been addressed. The third sequence is directly under the control of the conference circuitry. These three sequences do not necessarily occur in the order indicated. For purposes of this description, we will concern ourselves only with concentrator controller 307, although it should be recognized that the other concentrator controllers are acting in similar fashion in the establishment of connections between stations involving those terminating on the corresponding remote concentrators.

*Scan sequence 1*

During the first frame in sequence 1, concentrator controller 307 compares all the numbers stored in its line gate number memory 402 with a number generated for five successive frames. In this instance we will assume that that number designates station 200. Since it is assumed that station 200 has just now gone off-hook, its number will not be found in the line gate number memory 402. With station 200 off-hook at this time, and its number not stored in the line gate number memory 402, as indicated by the comparison with the generated number, a scan command signal is transmitted from line scanning control 400 via the C lead of link 13 to AND gates 251–254 in monitor circuit 210. As was indicated previously, a clock pulse was transmitted through the line circuit 201 to monitor circuit 210 via lead 250, indicating the off-hook condition of station 200. This clock pulse, together with the scan command received via the C lead of link 13, enables AND gate 251 to set flip-flop register 211. The clock pulse is also inverted and applied to AND gate 252 to assure that AND gate 252 remains disabled, thus preventing resetting of flip-flop 211 at this time. Since station 200 desires a conference connection, a button is depressed at the station to transmit a pulse through line circuit 201 to monitor 210 via lead 255, which pulse sets univibrator 256. This in turn enables AND gate 253 to set flip-flop register 212. The length of the output pulse of the univibrator 256 determines the period of time that flip-flop 212 remains in the set condition. One time slot in each frame is reserved for transmission of supervisory information. Thus during this supervisory time slot the information stored in the registers 211 and 212 is gated in sequence via AND gates 257 and 258, respectively, to the S lead of link 13. Receipt of these signals in the proper sequence in the control center D indicates to the control center that establishment of a conference connection is desired.

The second frame of sequence 1 is set aside to allow time for the scan result to reach the concentrator controller 307. During the third frame of sequence 1, the result of the scan is determined; in this instance a request for service and a request for establishment of a conference connection, the latter indication being stored in bridge gate memory 710.

Central control 304 keeps a record of all the time slots and conference bridges that are in service. If a time slot and junctor pair are available, they are reserved during frame 4 of sequence 1 for the calling station 200. The line number of the calling station 200 is stored in the line gate number memory 402 during the reserved time slot. Also during the assigned time slot, central control 304 causes the conference request signal to be stored in bridge memory 710. Central control 304 also determines that the assigned time slot will permit access to the junctor pair, including junctor gates **500*n*, which will allow station 200 to have access to the bridge gates 600*a*–600*n*. Also the address of the bridge 700*a* available for this conference is transmitted from central control 304 to the bridge gate address register 720**.

The time slot is assigned to the calling station 200 only during the fifth frame of a sequence 1. Upon its assignment, the address of bridge **700*a* is gated into the bridge gate memory 710. Along with the bridge gate address, an extra binary digit or bit called an "insert index" is stored in the bridge gate memory 710 to provide an address count. This defers enabling of "in use" register 615 in the assigned bridge line unit 602*a* until the next frame, which has no detrimental effect in that the bridge line units 602*a*–602*n* are not scanned until the third frame of a particular sequence, as indicated hereinafter. A dial tone is transmitted to calling station 200 from central control 304 via splitting and tone gates 408, the R lead of link 13, decoder 204, hybrid circuit 202, and the line circuit 201**.

*Scan sequence 2*

The party at station 200 now proceeds to dial or otherwise indicate the first called station's designation as his station permits. This is accomplished in the manner indicated in the aforementioned James et al. Patent 2,957,949, with the exception that a different time slot is assigned to the called station. After the calling station 200 has addressed the first called station 220, the second 5 frame sequence is required. This sequence is similar to sequence 1, but in this instance is directed to a determination as to whether the called station is available for connection. Thus in frame 1 of sequence 2 the number designating called station 220 is generated and compared with the content of the line gate number memory 402. Since it is assumed that station 220 is idle in this instance, its number will not be found in line gate number memory 402. It is also possible that station 220 has just recently gone off-hook preparatory to originating a call. Thus the corresponding line circuit is scanned to determine if such a request exists. Again, since it is assumed that station 220 is idle and available for the instant conference connection, this scan will produce a negative result. Again frame 2 is reserved to allow time for the scan result to reach controller 307. The scan result is determined in frame 3 and it is found that this station is not requesting service.

In frame 4 of sequence 2 central control 304 assigns a time slot to station 220 distinct from that previously assigned calling station 20 and also provides a ringing tone to station 220 via the splitting and tone gates 408, as previously indicated, for dial tone.

*Scan sequence 3*

The third sequence contains most of the action pertaining to the conference connection itself. It should be recognized that this sequence actually occurs many times prior to completion of sequence 2. In frame 1 the bridge gate number which was stored in memory 710 during the first sequence is gated to the bridge load comparator 760 and to the bridge gate address register 720. The requisite gating signal for this action occurs when the calling station number, the conference signal from monitor 210, the insert index, the scan gate number and the timing pulse are available concurrently. The gating signal also activates time slot counter 730. Counter 730 serves to gate the designation of bridge 700*a* to the bridge load comparator 760 at the proper time. This in turn results in a comparison which advances the bridge leg counter 750.

Time slot counter 730 counts time slots for one complete frame, provides the appropriate compare gate pulses to the bridge gate memory 710, as indicated, and also transmits timed output pulses to the bridge line unit scan translator 740 to initiate the scan, and to the bridge leg counter 750 for an end-of-count signal. Thus as the time slot assigned to each conferee is reached in a particular frame, the conference control circuit 303 automatically advances to the succeeding conferee's time slot and serves to actuate the appropriate bridge gate and bridge line unit during that time slot.

During frames 2 and 3 each address in the bridge gate memory 710 is gated to the bridge load comparator 760 to be compared with the bridge number of the calling station 200 during each time slot for one complete frame. Each time the comparison occurs, the bridge leg counter 750 is advanced by one count. If the bridge leg counter has a full count at the end of the frame, an inhibit signal is sent to central control 304 advising that bridge 700*a* is fully occupied and a busy tone is transmitted to calling station 200. Thus the party at station 200 may proceed to add additional stations to the conference connection merely by depressing the conference key at his station after each conferee is added and designating the next conferee to be added in the usual manner. He may continue to do so until he receives a busy tone indicating the maximum number of conferees are now included in the conference connection.

If the bridge leg counter 750 does not contain a full count at the end of a frame, the end-of-count pulse from time slot counter 730 causes the address in bridge gate address register 720 and the bridge leg address from the bridge leg counter 750 to be gated to bridge line unit scan translator 740. Translator 740 in turn provides a scan pulse to bridge line unit 602*a*, the address of calling station 200 which is the first to be gated into the translator 740 input. The in use register 615 was previously set, as indicated hereinbefore, such that the scan gate 630 is primed and will be enabled upon receipt of the scan pulse. This allows the scan pulse to be transmitted via lead 631 to bridge leg counter 750. This pulse is delayed sufficiently to prevent its coincidence with any previous scan pulse and then serves to advance the bridge leg counter 750, thus changing the address of the bridge leg to be examined next. It also transmits a signal to the bridge line unit scan translator 740 to determine if the new address is in use. If this address is also in use, the bridge leg counter 750 is advanced and each successive address is scanned until an available address is located. There must be an available address if bridge leg counter 750 did not indicate a full count at the end of a frame.

The foregoing scanning routine is required in that conferees previously assigned to bridge 700*a* may disconnect, thereby providing space for subsequent conferees to be added and also providing a condition in which the remaining conferees are not connected to the bridge 700*a* in a continuous sequence.

The scanning sequences taking place during frames 2 and 3 provide a bridge address for the first called station 220. When station 220 goes off-hook, this bridge address is inserted in bridge gate memory 710 during the time slot reserved for station 220.

The insert is accomplished in the same manner as that described in sequence 1 for calling station 200, with the exception that the insert index is inverted to distinguish between calling and called stations and the memory 710 recognizes this as the time slot reserved for the called station and stores the address.

In frame 5 the conference signal is erased from bridge gate memory 710 during the time slot assigned to calling station 200. The entire routine is now complete. Calling and called stations have been connected in distinct time slots and the system is now ready to receive a request from calling station 200 to add another conferee. The identical routine is followed as previously described for establishing a connection to called station 220.

ADDING PARTIES TO A CONFERENCE CONNECTION

We will now consider the situation occurring during the first frame of the first sequence when it is determined that calling station 220 requests a conference connection subsequent to the assignment of a time slot to that station. This is the situation resulting from a party to an active conference desiring to add an additional conferee.

In this instance the number of the requesting station 220 is found in the line gate number memory 402 during frame 1 of sequence 1 when its number is generated for comparison with the numbers stored in the line gate number memory 402. Having produced a comparison, the concentrator controller 307 now proceeds to scan the line associated with station 220 to determine if any change in condition has occurred, i.e., the station going on-hook or the conference signal being present. Again frame 2 is set aside to allow time for the scan result to return to controller 307. In frame 3 of sequence 1, central control 304 inserts the conference signal received from station 220 in the bridge gate memory 710, as described in the previous discussion of sequence 1. Having stored the conference signal in memory 710, central control 304 is notified that station 220 originating the conference signal is already occupied in a conference, so that no new conference bridge will be required to satisfy this request for conference service. Subsequent operations in adding conferees follow the sequences as previously described.

The foregoing description pertains to the establishment of a conference connection when all parties to the conference are found to be in an idle condition when first interrogated. However, if a busy called line is encountered during this process, the calling party will receive a timed busy tone from central control 304 via splitting and tone gates 408. This busy tone is also detected by the other conferees so that all conferees will be aware of the fact that the party desired to be added to their conference is not available. However, this indication in no way interferes with the conference connection already established.

Upon time-out of the busy tone, the request may again be initiated by station 220 or any one of the other stations in the conference connection. In the event that the bridge utilized for a particular conference is filled to capacity when a request to add an additional party is received, a similar busy tone is transmitted to the requesting station.

Any number of bridges compatible with system requirements may be utilized, the total number of bridges of course representing the maximum number of simultaneous conferences permitted in the system. The number of conferees, as determined by the number of legs on a bridge, is also dictated by system requirements, particularly available time slots, in that each conferee requires a distinct time slot. Similarly, a single bridge gate and bridge line unit correspond to a particular leg on a distinct bridge.

Of course the circuit in accordance with my invention is not limited to use on conferences, but may also be employed in a variety of operations which require the storage of information from a number of sources in a common medium, which in turn makes such information immediately available to all of the sources. Thus storage and retrieval of data may employ such an arrangement.

It is to be understood therefore that the above-described arrangements are illustrative of the application of the principles of the invention. Numerous other arrangements may be devised by those skilled in the art without departing from the spirit and scope of the invention.

What is claimed is:

1. In a communication system, a plurality of lines, a control unit, a concentrator connecting said lines to said control unit, means in said control unit defining a plurality of time slots in a repetitive cycle, and means for establishing a conference connection among a group of more than two of said lines comprising a conference circuit, means for assigning a distinct time slot to each line in the conference, means for transferring a signal from one of said conferring lines to said conference circuit, means for sampling said signal in each of the time slots assigned to the other conferring lines and means for transmitting said signal sample to each of said other conferring lines.

2. In a communication system, a control center, a line concentrator remote from said control center, a plurality of lines terminating on said concentrator, a time division link interconnecting said concentrator and said control center, and means for establishing a conference connection among a group of said lines comprising means for assigning each of said group of lines to a different time slot in a repetitive cycle, a conference bridge in said control center, means for transmitting a sample of information from one of said group of lines to said bridge in the assigned time slot via said link and means for transferring said sample of each of the other lines in said group via said link comprising means for interrogating said bridge in the time slot assigned to each of said other lines.

3. In a communicating system, the combination in accordance with claim 2, further comprising means in said concentrator for coding said information sample prior to transmission to said control center and means at said control center for converting said coded information sample to analog form prior to transmission to said conference bridge.

4. In a communication system, the combination in accordance with claim 2, further comprising a station terminating each of said plurality of lines and first means at said station for initiating a service request and wherein said means for assigning each of said group of lines to a different time slot comprises second means at said station for initiating a conference connection.

5. In a communication system, the combination in accordance with claim 4, wherein said second means comprises means for generating a conference signal and further comprising means at said control center responsive to receipt of said conference signal from said one of said group of lines for reserving said conference bridge.

6. In a communicating system, the combination in accordance with claim 2, further comprising a station terminating each of said plurality of lines, means at each of said stations for generating a conference signal and means at said control center responsive to receipt of said conference signal from a requesting one of said stations in said group active in a conference connection for permitting said requesting station to add another station to said conference connection.

7. In a communicating system, the combination in accordance with claim 6, further comprising a first source of timed busy tone and means responsive to a busy condition at the station to be added for transmitting a timed busy tone from said first source to said requesting station and wherein each of said stations in the conference connection is capable of reinitiating the request to add a station to said conference connection upon time-out of said busy tone.

8. In a communication system, the combination in accordance with claim 7, further comprising a second source of timed busy tone and means responsive to a fully occupied condition of said conference bridge for transmitting a timed busy tone from said second source to said requesting station.

9. In a time division switching system, a control unit, a plurality of lines arranged in groups, a plurality of concentrators each connecting a distinct group of said lines to said control unit, means for defining a plurality of time slots in a repetitive cycle, and means for establishing a conference connection among a group of said lines terminating on a plurality of said concentrators comprising means responsive to a request from one of said group of lines for assigning a distinct time slot to each line in the conference, a conference circuit in said control unit, means for transferring a signal from one of said conferring lines through the corresponding one of said concentrators to said conference circuit and means for transmitting said signal sample to each of said other conferring lines in the corresponding assigned time slots via the corresponding concentrators.

10. In a communication system, a plurality of lines, means for defining a plurality of time slots in a repetitive cycle, and means for establishing a connection among a group of said lines comprising means responsive to a request from one of said group of lines for assigning a different time slot to each line in the group connection, a multiple address circuit, means for transferring a signal from one of said group of lines to said multiple address circuit and means for transmitting said signal to each of the other lines in said group in the corresponding assigned time slots, said multiple address circuit comprising an analog bridge having means for circulating said signal and means for sampling said signal in the time slot assigned to each line in said group.

11. In a communication system, the combination in accordance with claim 10 and further comprising means for assigning a plurality of said bridges to said group connection.

12. In a communication system, the combination in accordance with claim 10, further comprising a station terminating each of said plurality of lines and first means at said station for initiating a service request and wherein said means for assigning each of said group of lines to a different time slot comprises second means at said station for initiating a group connection.

13. In a communication system, the combination in accordance with claim 12, wherein said second means comprises means for generating a group connection signal and further comprising means responsive to receipt of said group connection signal from said one of said group of lines for reserving said multiple address circuit.

14. In a communication system, the combination in accordance with claim 10, further comprising a station terminating each of said plurality of lines, means at each of said stations for generating a group connection signal and means responsive to receipt of said group connection signal from a requesting one of said stations already active in a group connection for permitting said requesting station to add another station to said group connection.

15. In a communication system, the combination in accordance with claim 14, further comprising a first source of timed busy tone and means responsive to a busy condition at the station to be added for transmitting a timed busy tone from said first source to said requesting station and wherein each of said stations in the group connection is capable of reinitiating the request to add a station to said group connection upon time-out of said busy tone.

16. In a communication system, the combination in accordance with claim 15, further comprising a second source of timed busy tone and means responsive to a fully occupied condition of said multiple address circuit for transmitting a timed busy tone from said second source to said requesting station.

References Cited

UNITED STATES PATENTS

| | | | |
|---|---|---|---|
| 3,204,043 | 8/1965 | Arsenau et al. | 179—18 |
| 3,274,342 | 9/1966 | Brightman | 179—18 |
| 3,293,369 | 12/1966 | Schroeder | 179—18 |

WILLIAM C. COOPER, *Primary Examiner*.